Patented Aug. 23, 1932

1,872,956

UNITED STATES PATENT OFFICE

ALPHONS O. JAEGER AND JOHANN A. BERTSCH, OF ST. LOUIS, MISSOURI; SAID JAEGER ASSIGNOR TO THE SELDEN COMPANY, OF PITTSBURGH, PENNSYLVANIA, A CORPORATION OF DELAWARE

CATALYTIC PROCESS AND APPARATUS

No Drawing. Application filed February 6, 1926. Serial No. 86,654.

This invention relates to catalytic processes and appaartus and particularly to catalytic processes and apparatus used in catalytic oxidations of organic compounds.

Many catalytic organic reactions, particularly oxidations and reductions, are carried out in stages and usually the product desired is a product of an intermediate stage. Thus, for example, almost all of the products of catalytic oxidations of organic compounds, which are desired, are intermediate stages of the general oxidation reactions which, when carried to completion, result in the production of carbon dioxide and water. The reactions are usually carried out in metal converters and the metals, and particularly their reaction products with oxygen, form catalysts which tend to carry the reaction too far with the production of carbon dioxide and water. This is a serious loss in many reactions and great pains are usually taken to reduce the amount of complete combustion to a minimum, even though this entails, in some cases, a considerable loss of efficiency in the process.

It is the object of the present invention to prevent or to greatly minimize the deleterious catalytic effects of metal converters and piping and, in some of its more specific aspects, the invention contemplates an actual increase in the efficiency of the catalytic process itself.

With these and other objects in view, the invention consists in coating the portions of the catalytic apparatus, which come in contact with the reaction gases, with a coating of compounds of the alkali metals or alkaline earth metals including magnesium compounds. We have found that even a very thin coating of oxides or salts of the alkali metals or alkaline earth metals which, for convenience, will be called by the generic term of "alkali forming metals", will render the metal surfaces catalytically inactive and harmless.

While the principal object of the present invention lies in the prevention of complete combustion, due to the catalytic effect of metal apparatus, in a more specific aspect, the invention contemplates the actual enhancement of the efficiency of the process by incorporating catalytically active compounds in the alkali forming metal compound coating. Thus, for example, in oxidation reactions of organic compounds, vanadium salts or compounds may be added to the alkali forming metal compounds coating with a considerable increase in efficiency of the process.

The reasons for the catalytic activity of metal apparatus are not fully known, but it appears probable that the most serious effects are caused by the formation of a thin, finely divided layer of oxide during the use of the apparatus as losses from total combustion increase rapidly with the age of the converter and mechanical cleaning of the converter walls effects but a temporary improvement. In the case of iron and steel converters, the oxides formed, such as ferric oxide and magnetic oxide, are strong combustion catalysts as will be shown by the examples described below:

The lining of converters with copper, brass, aluminum or silver, is effective in the case of some reactions, such as, for example, oxidation of methyl alcohol to formaldehyde but, in many reactions, the lining appears to act in the same way as iron and to cause considerable losses by total combustion.

The present invention is applicable generally to catalytic oxidations of organic compounds of all types and is particularly effective in the oxidation of benzol and phenol to maleic acid, anthracene to anthraquinone, methyl alcohol to formaldehyde, acenaphthene to acenaphthoquinone and naphthalic anhydride, cresol to salicylic acid, toluol and its derivatives and nuclear substitutive products to the corresponding aldehydes and acids, ethyl alcohol to acetic acid, ethylene chlorhydrin to chloracetic acid, naphthalene to alpha-naphthaquinone and phthalic anhydride, phenanthrene to phenanthraquinone, fluorene to fluorenone, and the like.

Any of the oxides or salts of the alkali forming metals may be used, such as sulfites, sulfates, chlorides, nitrates, and the like. Alkali metal silicates are also effective.

The coating compounds may be applied by treating the walls of the apparatus with solutions or by dusting the compounds onto surfaces. The latter procedure is preferably carried out with hot apparatus so that the material which is dusted on sticks. A very efficient method of applying the protective alkali forming metal compound coating consists in treating the walls to be coated with a strong solution of caustic alkali or alkaline earth metal hydroxide and then exposing the wet walls to the vapors of acids, such as $SO_2$, $SO_3$, HCl, oxides of nitrogen, chlorine, and the like. Alkali metal silicate solutions may also be applied directly in the form of a coating.

Low melting alkali forming metal compounds, such as acid potassium sulfate and phosphates, may be applied in a molten condition. The thin salt crust formed burns into the walls when heated up to the operating temperatures of 300–500° C. and completely inactivates the metal apparatus.

It is important to completely cover all of the walls which are exposed to the reaction gasses and, for this purpose, it is usually desirable to remove such of the converter elements as are not readily reached, in order to more thoroughly coat them. The coating should not only cover the walls of the converters themselves but also such metal piping as may be used, particularly piping which is subjected to elevated temperatures.

Instead of coating catalytic apparatus with alkali forming metal compounds which inactivate the metal, positive activators or catalysts may be combined with alkali forming metal compounds and serve to actually increase the catalytic efficiency of the process as they are present in a very finely divided state and present a large surface to the reaction gases. We have found that the catalytically active acids of the elements, such as vanadium, molybdenum, uranium, tungsten, chromium, and other catalytically active acid forming elements, may be effectively combined with alkali forming metal elements in the form of salts, either acid, neutral or basic. The catalytically active acids may be mixed with alkali forming metal compounds before application or successive treatments with alkali forming metal compounds and with catalytically active compounds may take place.

The following examples will illustrate the effect of the protective coating of the present invention but are to be considered merely as illustrations of the method of operation of the invention and, in no sense, limit its scope.

*Example 1*

Mixtures of methyl alcohol and air, ethyl alcohol and air, toluol and air, benzol and air, naphthalene and air, or anthracene and air, are passed through an empty glass tube at 350–450° C. Only traces of total combustion can be noted by absorbing the carbon dioxide produced in a barium hydroxide solution.

*Example 2*

The glass tube in Example 1 is filled with fragments of iron which have slightly rusted and the gas mixtures described in the example are passed through under the same conditions of temperature, pressure and gas speed. A large percentage of total combustion is at once noted. Thus, for example, the naphthalene and air mixture showed from 25–30% total combustion and the methyl alcohol air mixture showed up to 50%

*Example 3*

The iron fragments used in Example 1 are rolled in molten potassium hydrogen sulfate and the excess liquid removed. They are then filled into the glass tube and given a preliminary heat treatment for a short period at 400–500° C. Naphthalene and air at 350–420° C. are passed through the tube, under the same conditions as in Example 2, and only 1–2% of total combustion can be noted by absorbing the carbon dioxide produced. This excellent yield can be continued indefinitely. Potassium phosphates may be substituted for potassium hydrogen salfate with the same excellent effects.

*Example 4*

The iron fragments of Example 3 are impregnated with potassium vanadate instead of potassium hydrogen sulfate and are then treated with sulfur trioxide. The same low percentage of total combustion can be noted as in Example 3 and there was actually a noticeable production of alpha napthaquinone and phthalic anhydride.

*Example 5*

An iron or steel tube is substituted for the glass tube in Example 1 and at once a considerable amount of total combustion was evident which increased to 30% on continuous operation with benzol, toluol, naphthalene and anthracene. With methyl alcohol, the total combustion was still higher.

*Example 6*

An iron or steel tube was soaked with a potassium hydrogen sulfate solution and then dusted hot with potassium sulfate or sodium hydrogen phosphate. The total combustion with air mixtures of naphthalene, benzol, toluol, or anthracene, did not exceed 1-2%. A similar effect was noted when the tube was dusted hot with a mixture of potassium sulfate and potassium vanadate but, in this case, not only was the total combustion relatively insignificant, but a noticeable amount of intermediate oxidation products was obtained.

*Example 7*

A converter was coated with potassium hydrogen sulfate, potassium hydrogen phosphate, or a mixture of potassium sulfate and potassium vanadate. A phthalic anhydride catalyst is filled into the converter and a naphthalene and air mixture is passed through under the usual operating conditions. The yields are almost quantitative. The same process was carried out in an untreated steel tube converter under the same conditions. The yields at the start were less than 90% and, on continued operation, sank below 80%.

Similar results were noted with anthracene and air, the phthalic anhydride catalyst, of course, being substituted by the catalyst suitable for the oxidation of anthracene to anthraquinone.

What we claim as new is:

1. The method of vapor phase organic catalysis which comprises contacting the reaction gases with catalysts in closed chambers, exposed parts of which are of metal, and of which the metal surfaces otherwise exposed to contact with the reaction gases are substantially all coated with alkali forming metal compounds.

2. The method of catalytically oxidizing organic compounds which comprises contacting vapors of the compounds, mixed with oxygen containing gases, with catalysts in closed chambers, exposed parts of which are of metal, and of which the metal surfaces otherwise exposed to contact with the reaction gases are coated with alkali forming metal compounds.

3. The method of vapor phase organic catalysis which comprises contacting the reaction gases with catalysts in closed chambers, exposed parts of which are of metal, and of which the metal surfaces otherwise exposed to contact with the reaction gases are coated with alkali forming metal compounds containing catalytically active radicals.

4. The method of catalytically oxidizing organic compounds which comprises contacting vapors of the compounds, mixed with oxygen containing gases, with catalysts in closed chambers, exposed parts of which are of metal, and of which the metal surfaces otherwise exposed to contact with the reaction gases are coated with alkali forming metal compounds containing catalytically active radicals.

5. Catalytic apparatus for vapor phase organic catalyses, having the metal surfaces which come in contact with the reaction gases substantially all coated with solid alkali forming metal compounds.

6. Catalytic apparatus for vapor phase organic catalyses, having metallic walls which come in contact with the reaction gases coated with alkali forming metal compounds containing catalytically active radicals.

7. The method of vapor phase organic catalysis which comprises contacting the reaction gases with catalysts in closed chambers, exposed parts of which are of metal, and of which the metal surfaces otherwise exposed to contact with the reaction gases are chemically combined with an alkali forming metal.

8. Catalytic apparatus for vapor phase organic catalyses, which comprises a reaction chamber and a coating of an alkali forming metal compound upon the surfaces of structural members otherwise exposed within said chamber which would otherwise exert an objectionable influence upon the reaction.

Signed at St. Louis, Missouri, this 28th day of January, 1926.

ALPHONS O. JAEGER.
JOHANN A. BERTSCH.